United States Patent [19]

Guillou et al.

[11] Patent Number: 4,543,559

[45] Date of Patent: Sep. 24, 1985

[54] GENERATOR OF ENCODING OR DECODING 8-BIT BYTES WHICH CAN BE USED IN A VIDEO SYSTEM

[76] Inventors: Louis C. Guillou, 16 rue de l'Ise BourgbarréF-35230 St. Erblon; Raymond Le Bris, 7 Allée de Lanester; Ambroise Le Rest, 18 rue de Brest, both of, 35000 Rennes, all of France

[21] Appl. No.: 456,749

[22] Filed: Jan. 10, 1983

[30] Foreign Application Priority Data

Jan. 11, 1982 [FR] France ................................ 82 00288

[51] Int. Cl.⁴ .............................................. H04L 3/00
[52] U.S. Cl. .............................. 340/347 DD; 340/801; 358/903
[58] Field of Search ................ 358/903; 340/347 AD, 340/347 DA, 347 R, 347 M, 347 C, 801; 375/25

[56] References Cited

U.S. PATENT DOCUMENTS 4,160,120  7/1979  Barnes et al. .

FOREIGN PATENT DOCUMENTS 0014652  8/1980  European Pat. Off. .
0028272  5/1981  European Pat. Off. .
2634353  1/1978  Fed. Rep. of Germany .
2044948  2/1971  France .

Primary Examiner—T. J. Sloyan

[57] ABSTRACT

The generator comprises three subassemblies, each comprising an adder and registers, said three subassemblies making it possible to provide three recursive sequences. Each sequence is dependent on variables constituted by initialization bytes. One state of the generator is defined by a particular combination of three sequences and each state determines an output variable, which is the desired coding or decoding byte.

1 Claim, 3 Drawing Figures

GENERATOR OF ENCODING OR DECODING 8-BIT BYTES WHICH CAN BE USED IN A VIDEO SYSTEM

BACKGROUND OF THE INVENTION

The present invention relates to a generator of encoding or decoding 8-bit bytes, which can in particular be used in a video system.

It is firstly pointed out that in a videography system, such as the ANTIOPE system, the information is coded in the form of bytes constituted by a most significant bit $b_8$ which is an imparity bit, three most significant bits $b_7$, $b_6$, $b_5$ and four least significant bits $b_4$ to $b_1$.

The bytes can be separated into control bytes and data bytes. The control bytes particularly indicate ends and headings of pages, as well as ends and headings of rows. The data bytes, inserted between the control bytes, correspond to characters contained in the rows.

The codes which can be written by means of such bytes are organized according to a table with eight columns according to values of $b_5$, $b_6$, $b_7$ and 16 rows according to values of $b_1$, $b_2$, $b_3$, $b_4$. In such a table:

- columns 0 and 1, which correspond to the bytes, whose 6th and 7th bits are zero, contain the control bytes,
- columns 2 and 3 essentially contain the punctuation marks and numbers,
- columns 4 and 5 mainly contain capital letters,
- columns 6 and 7 mainly contain small letters.

For example, a running page of information, which is accessible to the user, is in the following form:

1. it firstly contains a page heading formed by control codes (ETX) FF RS $NP_1$ $NP_2$ $NP_3$, in which ETX is a code finishing the preceding page, FF is a code indicating a new page, RS is a page flag and $NP_1$ $NP_2$ $NP_3$ are codes indicating a page number ranging from 001 to 999;
2. the page heading is followed by a "zero" row: US 00 $C_1$ $C_2$ $C_3$ ... RC LF, in which US is a row flag, 00 indicates the zero rank, $C_1$ $C_2$ $C_3$ are complementary codes and RC LF finish the row;
3. following the zero row there are information rows firstly consisting of a row heading formed by the codes (RC LF) US $NR_1$ $NR_2$, in which RC LF terminate the preceding row, US is a row flag and $NR_1$, $NR_2$ constitute the row number ranging from 01 to 24.

There then follows the data bytes $d_1$, $d_2$, ... $d_n$, which are inserted between the running row heading and either an end of row, start of another row, or an end of page. These bytes $d_1$, $d_2$ ... $d_n$ represent the information constituting the service provided.

French patent application No. FR-A-2 448 824 describes means for only interlocking the information carried in the displayable rows of ordinary pages of the magazine. In other words, interlocking does not affect the control codes appearing in clowmns 0 and 1 of the table of codes referred to hereinbefore and in particular codes ETX, FF, RS, RC, LF and US. It only affects data $d_1$, $d_2$, ... Moreover, the means provided in the aforementioned application respect the imparity of the data bytes.

These results are achieved by the use of an interlocking automaton comprising means for forming a sequence of encoding bytes, whose bits $c_1$ to $c_8$ are produced in the following way:

$c_1$, $c_2$, $c_3$, $c_4$, and $c_5$ are sampled at the output of a pseudo-random sequence generator, reinitialized at the start of each displayable row by a service key K and by the numbers of the page and the row in question, $c_6$ and $c_7$ are at zero, $c_8$ is a parity bit.

Thus, the coding or encoding sequence obtained is formed by even bytes, designated $C_1$, $C_2$, ... $C_n$ or in generic terms $C_j$. The plane or clear bytes (i.e. before locking) constiting an information row form a sequence $d_1$, $d_2$, ... $d_n$ or generically $d_j$, said bytes being uneven or odd. They are locked by the coding bytes in accordance with the following rules. For each new clear byte of the displayable rows, a byte of the coding sequence is sampled:

if the clear byte belongs to columns 0 and 1 of the table of codes ($b_6 = b_7 = 0$), said byte is transmitted as it is and the coding byte is not used, if the even byte does not belong to columns 0 or 1, it is combined with the coding byte in a logic exclusive OR circuit for forming a locked byte $D_j = d_j \oplus C_j$, in which the symbol $\oplus$ represents the logic exclusive OR operation.

Due to the parity of the coding bytes, the supplied bytes are uneven, like the clear bytes. Moreover, the exclusive OR operation leads to the substitution of the clear byte by a locked byte belonging to the same group of columns as the clear byte, namely:

the group of columns 2 and 3, which essentially contains the punctuation marks and numbers, the group of columns 4 and 5, which mainly contain capital letters, the group of columns 6 and 7, which mainly contains the small letters.

Finally, the bytes belonging to columns 0 and 1 are not modified, especially the bytes corresponding to codes ETX, FF, RS, RC, LF and US, which are transmitted as such. Moreover, due to the fact that the 6th and 7th bits of the coding bytes are zero, there is no introduction of new bytes belonging to these columns.

On reception, it is necessary to unlock the information, for which purpose the receiver comprises a decoding byte generator, which supplies the bytes formed in the following way:

the five least significant bits are sampled in a quasi-random sequence obtained by a generator reinitialized for each row heading by the service key K, by the page number and by the row number in question, the 6th and 7th bits are zero, the 8th bit is forced to zero.

The unlocking rules are identical to the locking rules, a new decoding byte being produced for each new received byte belonging to a locked row. Two cases can occur:

if the received byte belongs to columns 0 and 1, it is transmitted as it is to the interpretation circuits, if the received byte does not belong to columns 0 and 1 (because its 6th and/or 7th bits are not zero) it is combined by an exclusive OR circuit with a decoding byte before continuing interpretation.

After describing the above points, the present invention can be defined. In the aforementioned French Patent Application, generator polynomials combined by a non-linear logic were used for producing the pseudo-random sequence. A system of flip-flops and exclusive OR gates were used. Such a generator indeed supplies coding or decoding bytes adapted to the message to be coded or decoded. However, its performance levels are mediocre, when it is introduced as software into the decoder microprocessor. Thus, in an ANTIOPE decoder equipped with a standard microprocessor, approximately 6 seconds are required for decoding and interpreting a page containing one kilo-byte.

BRIEF SUMMARY OF THE INVENTION

The present invention relates to a coding or decoding byte generator obviating the aforementioned disadvantage, in that it makes it possible to reduce the aforementioned time from 6 to 0.4 seconds for an equivalent complexity. A number of instructions required for producing a coding or decoding byte is consequently significantly less in the case of the present invention.

Another advantage provided by the invention is a significant gain on the period of the pseudo-random sequence produced. With the generator described in the aforementioned French Patent Application, the period of the sequence was: $(2^{17}-1)\cdot(2^{19}-1)\cdot(2^{31}-1)$, i.e. approx. $1.4 \cdot 10^{17}$ bytes.

With the generator according to the present invention, the period of the sequence is the smallest common multiple of $(31^7-1)$, $(127^7-1)$, $(31^5-1)$, i.e. approximately $2.3 \cdot 10^{30}$ bytes.

According to the invention these results are obtained by the use of three subassemblies, each comprising an adder and registers, said three subassemblies making it possible to provide three recursive sequences. Each sequence is dependent on variables constituted by initialisation bytes. One state of the generator is defined by a particular combination of three sequences and each state determines an output variable, which is the desired coding or decoding byte.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
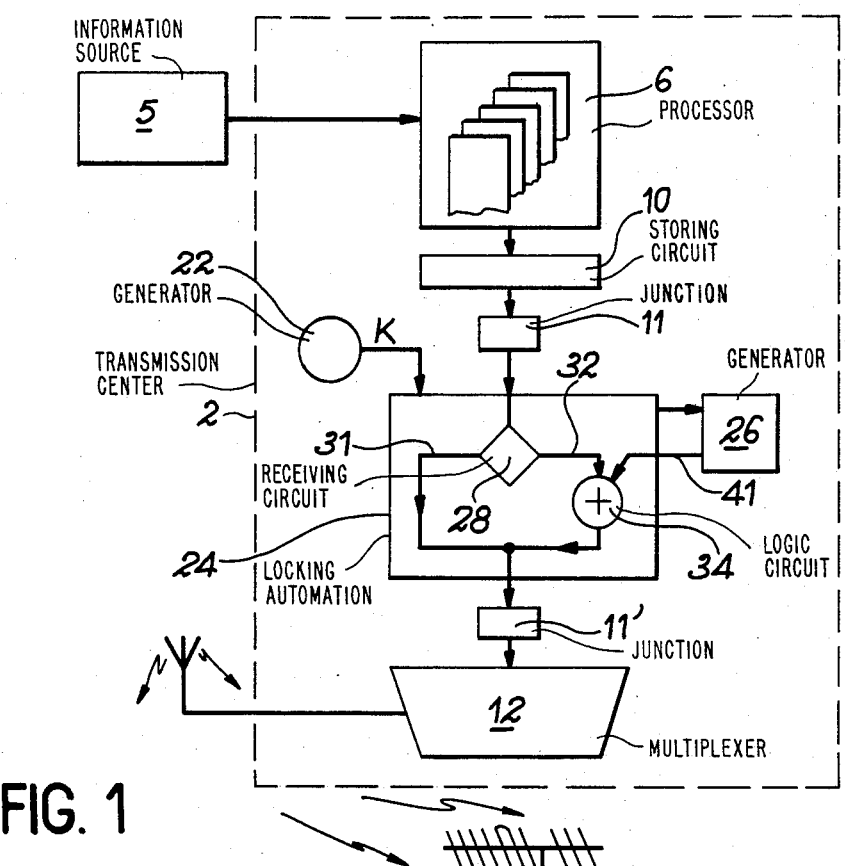
FIG. 1 a video system equipped with access control means, whilst illustrating the location of the generator according to the invention.
Figure 1:
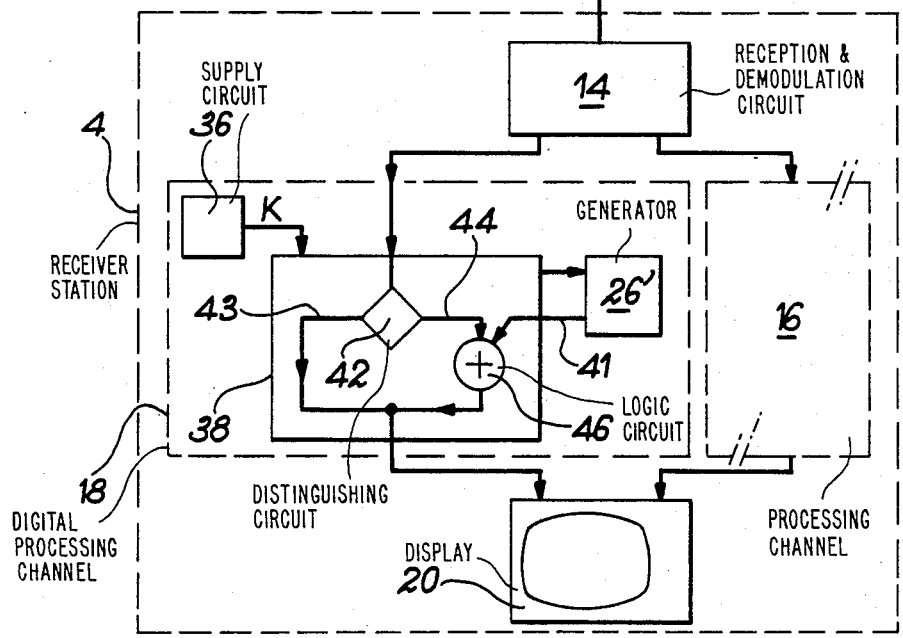

The system shown in FIG. 1 comprises:
a transmission centre 2 incorporating:
    means 6 for processing a magazine constituted by pages organised into rows of characteris, if said means is not already in information source 5,
    a circuit 10 for storing the magazine in the form of digital signals,
    a plurality of junctions 11 connected to circuit 10,
    a multiplexer 12 for inserting information in lines of a television signal,
receiver stations 4, incorporating:
    a circuit 14 for the reception and demodulation of said television signal,
    a channel 16 for processing the picture video signals,
    a channel 18 for processing digital signals, more particularly containing a digital signal decoder,
    a display means 20.

The represented system also comprises in transmission centre 2:
(a) a generator 22 supplying a digital signal representing a service key K, which can change in a random manner at given intervals of e.g. a few minutes;
(b) a locking automaton 24 incorporating:
  (i) a circuit 28 having an input connected to the magazine storage circuit 10, from which it receives clear bytes, said circuit being able to distinguish among said clear bytes those whose 7th and 6th bits are zero, said circuit having two outputs 31, 32, the first carrying the bytes with the 7th and 6th bits zero and which is connected to the multiplexer 12 (across a junction 11') and the second carrying clear bytes $d_j$, whose 7th and/or 6th bits are not zero;
  (ii) a logic circuit 34 of the exclusive OR type with two inputs, one connected to the second output 32 of comparator 28 from where it receives the clear bytes $d_j$ with non-zero 6th and 7th bits, said logic circuit having an output carrying uneven coded bytes $D_j$, the coded bytes then being directed (cross junction 11') to multiplexer 12;
(c) a generator 26 of coding bytes $C_j$, controlled by automaton 24 from where it receives the bytes indicating the page numbers and row numbers of the data to be transmitted and the signals corresponding to the service key K, said byte generator 26 supplying, for each data byte $d_j$ of a displayable row, a coding byte $C_j$, which has an 8th parity bit and seventh and 6th zero bits, said byte being applied to the second input of gate 34. Moreover, in each receiving station 24, there are:
(d) a circuit 36 supplying a digital signal representing the service key K in use in the transmission station;
(e) an unlocking automaton 38 incorporating:
  (i) a circuit 42 having an input receiving coded bytes, said circuit being able to distinguish from among the coded bytes, those whose seventh and 6th bits are zero, said circuit having two outputs 43, 44, the first carrying the bytes whose 7th and 6th bits are zero, said first output being connected to the display means 20, whilst the second carries the coded bytes $D_j$, whose 7th and/or 6th bits are not zero,
  (ii) a logic circuit 46 of the exclusive OR type with two inputs, one being connected to output 44 of circuit 42 from where it receives coded bytes $D_j$, said logic circuit having an output carrying the decoded bytes $d_j$, which are then directed to the display means 20;
(f) a decoding byte generator 26', controlled by the unlocking automaton, from where it receives the bytes indicating the page numbers, the transmitted data row numbers and the signal corresponding to the used service key K, said decoding byte generator having an output 41 which supplies, for each coded byte received, a decoding byte $C_j$ having a most significant bit which is forced to zero and zero 7th and 6th bits, said bytes being applied to the second input of gate 46.

Figure 2:
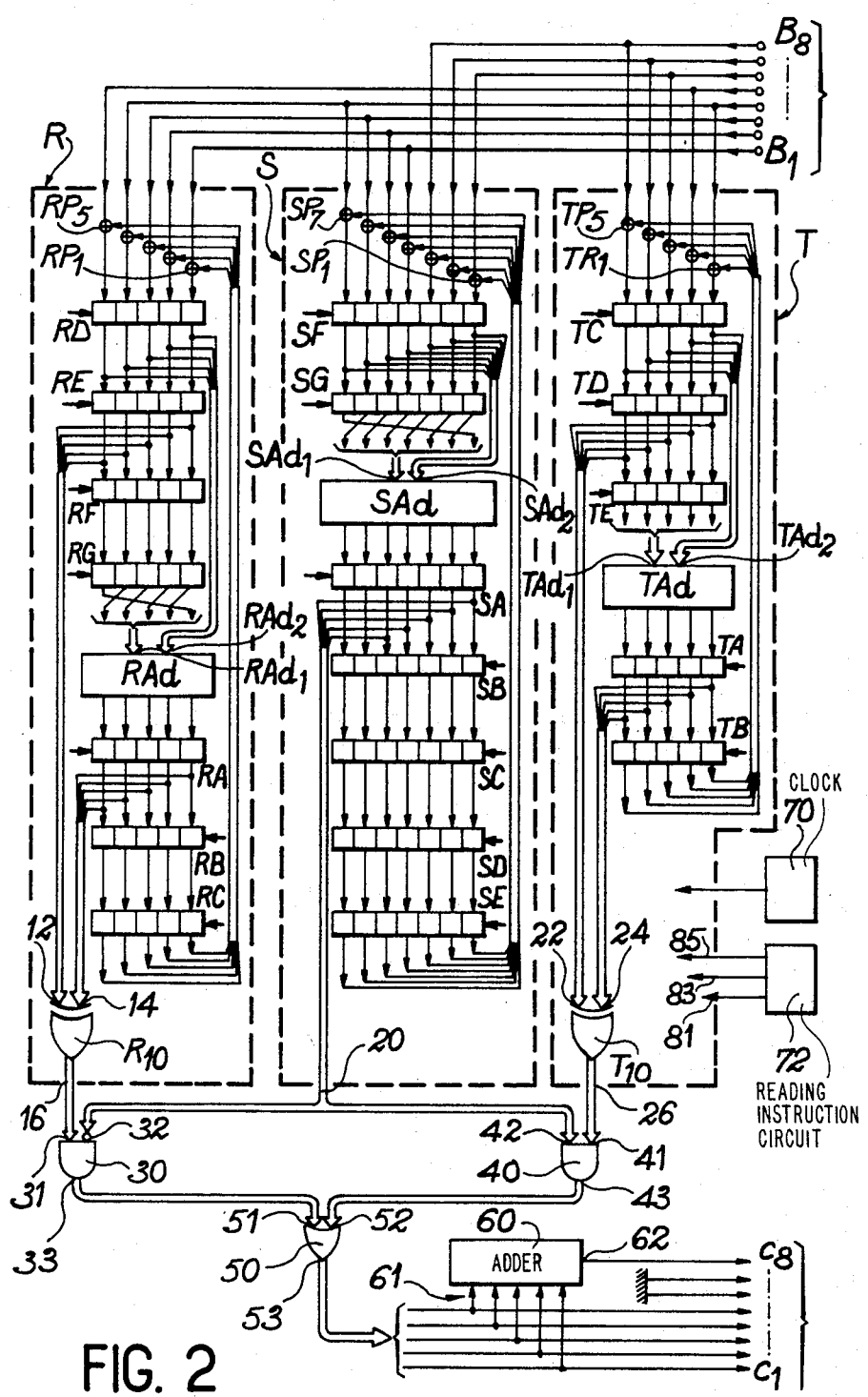
FIG. 2 the generator according to the invention.

The invention relates more particularly to the coding byte generator 26 and decoding byte generator 26'. The structure of such a generator is shown in FIG. 2.

As shown, the circuit has eight input accesses, respectively $B_8, B_7, \ldots B_1$ with most significance at the heading and three subassemblies R, S and T.

The first subassembly R is constituted by 5 logic exclusive OR gates $RP_5 \ldots RP_1$ with two inputs and an output, 7 registers RA, RB, RC, RD, RE, RF, RG and an adder modulo 31 RAd. The registers and adder have 5 bits and parallel inputs-outputs. The adder has two groups of inputs $RAd_1$ and $RAd_2$.

The connections between these different bits are as follows: gates $RP_5, \ldots RP_1$ have an input connected to the 5 least significant accesses $B_5 \ldots B_1$, the first register RD has its inputs connected to the outputs of the 5 aforementioned gates and its outputs connected on the one hand to the inputs of register RE and on the other hand to the inputs of group $RAd_2$ of the adder. The outputs of register RE are connected to the inputs of register RF, whose outputs are connected to the inputs of register RG. The outputs of the latter, following circular shift by one rank towards the higher significance levels, are connected to the inputs $RAd_1$ of the adder. The outputs of the latter are connected to the inputs of register RA, whose outputs are connected to the inputs of register RB. The outputs of the latter are connected to the inputs of register RC and the outputs of the latter are relooped on to the second inputs of gates $RP_5 \ldots RP_1$.

The first subassembly R also has a logic exclusive OR, 5-bit circuit $R_{10}$, having a first group of inputs 12 connected to the outputs of register RE and a second group of inputs 14 connected to the outputs of register RA. This circuit has a 5-bit output constituting the output 16 of the first subassembly R.

The circuit has a second subassembly S constituted by 7 exclusive OR logic gates $SP_7 \ldots SP_1$ with two inputs and an output, 7 registers SA, AB, SC, SD, SE, SF, SG and an adder SAd modulo 127. The registers and adder have 7 bits and parallel inputs-outputs. The adder has two groups of inputs $SAd_1$ and $SAd_2$.

The connections between all these bits are as follows: the four gates $SP_7, SP_6, SP_5, SP_4$ have an input connected to the four least significant accesses $B_4, B_3, B_2, B_1$ and the three other gates $SP_3, SP_2, SP_1$ have an input connected to the most significant accesses $B_7, B_6, B_5$. The inputs of the first register SF are connected to the outputs of the aforementioned gates and its most significant inputs to accesses $B_1, B_2, B_3, B_4$. The outputs of registers SF are connected on the one hand to the inputs of register SG and on the other to inputs $SAd_2$ of the adder. The outputs of register SG are connected, after circular shift by one rank towards the highest significance levels, to input $SAd_1$ of the adder. The outputs of the adder are connected to the inputs of register SE, which is connected to registers SE, SD and SF in series. The outputs of register SE are relooped on to the second inputs of gates $SP_7 \ldots SP_1$. This second subassembly S has a 5-bit output 20, which form the five least significant bits of register SA.

The circuit has a third subassembly T constituted by 5 logic exclusive OR gates $TP_5 \ldots TP_1$ having two inputs and an output, 5 registers TA, TB, TC, TD, TE and an adder TAd modulo 31. The registers and adder have 5 bits and parallel inputs-outputs. The adder has two groups of inputs $RAd_1$ and $TAd_2$.

The connections between these bits are as follows: gates $TP_5$ to $TP_1$ have an input connected to the 5 most significant accesses $B_8, B_7, B_6, B_5, B_4$, whilst the inputs of the first register RC are connected to the outputs of the aforementioned gates. The outputs of this register are connected on the one hand to the inputs of register TD and on the other to the inputs $TAd_2$ of the adder.

The outputs of register TD are connected to the inputs of register TE. The outputs of this register are connected to the inputs of adder $TAD_2$. The outputs of the latter are connected to the inputs of register TA. The outputs of this register are connected to the inputs of register TE, whose outputs are relooped on to the second inputs of gates $TP_5 \ldots TP_1$.

This third subassembly T also has a logic exclusive OR circuit $T_{10}$ with five bits, incorporating a first group of inputs 22 connected to the outputs of register TD and a second group of inputs 24 connected to the outputs of register TA. This logic circuit has a 5-bit output constituting the output 26 of the third subassembly T.

The circuit also has a first 5-bit, logic AND circuit 30 with two inputs 31, 32 and an output 33. One of the inputs 31 is connected to the output 16 of the first subassembly R and the other reversed input 32 is connected to output 20 of the second subassembly S.

The circuit also has a second 5-bit, logic AND circuit 40 with two inputs 41, 42 and an output 43. One of the inputs 41 is connected to the output 26 of the third subassembly T and the other 42 is connected to output 20 of the second subassembly S.

The circuit also has a 5-bit, logic OR circuit 50 with two inputs 51, 52 and an output 53. One of the inputs 51 is connected to the output 33 of the first logic exclusive OR circuit ($R_{10}$) and the other 52 to output 43 of the second exclusive OR circuit ($T_{10}$). The circuit also has a modulo 2 adder 60 with a 5-bit input 61 connected to output 53 of logic circuit 50 and a 1-bit output 62. Finally, the circuit has eight output accesses, respectively $c_8, c_7 \ldots c_1$, with the most significance at the heading, access $c_8$ being connected to output 62 of adder 60, accesses $c_6$ and $c_7$ are permanently maintained at logic state 0 and the five accesses $c_5, c_4 \ldots c_1$ are connected to the 5-bit output 53 of logic circuit 50.

The circuit is completed by a clock 70, which controls a circuit 72 able to transmit on a connection 81 a reading instruction for the registers, on a connection 83 a resetting instruction and on a connection 85 a writing instruction. These three connections are directed to each of the registers, which is symbolized in FIG. 2 by a single horizontal arrow to the right of each register.

This circuit functions in the following way. The initialization bytes, whose structure will be described hereinafter, are applied to accesses $B_8, B_7 \ldots B_1$. These bytes make it possible to bring the generator into an initial state. The special connections of the first registers RD, SF and TC to certain of the accesses $B_8, \ldots B_1$ (across logic gates) define three initialization numbers, respectively RI, SI and TI, used by the three subassemblies R, S and T. On designating by $b_i$ the bit applied to input $B_i$. we respectively obtain:

$RI = b_5\ b_4\ b_3\ b_2\ b_1$ i.e. $0 \leq RI \leq 31$ $SI = b_4\ b_3\ b_2\ b_1\ b_8\ b_7\ b_6$ i.e. $0 \leq SI \leq 127$ $TI = b_8\ b_7\ b_6\ b_5\ b_4$ i.e. $0 \leq TI \leq 31$ The state of the generator is characterized at each instant by the combination of the states of the three subassemblies R, S and T. Each state of a subassembly is dependent on the preceding states of said subassembly. Taking account of the connections referred to hereinbefore, we obtain:

$r_{i+1} = r_{i-3} + 2 \cdot r_{i-6}$ modulo 31

$$s_{i+1} = s_{i-5} + 2 \cdot s_{i-6} \text{ modulo } 127$$

$$t_{i+1} = t_{i-2} + t_{i-4} \text{ modulo } 31$$

if r, s and t designate a state of the subassemblies R, S and T and if the subscript has a rank which is a function of the integral i, e.g. the 8th state of R, i.e. $r_8$ is equal to $r_4 + 2r_2$. The overall state of the generator is defined at any time n by a group $x_n$ of words, which are the contents of registers and can be designated:

$$x_n = \begin{pmatrix} RA; RB; RC; RD; RE; RF; RG \\ SA; SB; SC; SD; SE; SF; SG \\ TA; TB; TC; TD; TE \end{pmatrix}$$

in which RA, RB etc. designate the content of the registers of the same notation.

This state comprises 109 bits distributed as follows:
7 words of 5 bits for the sequence r (registers RA to RG)
7 words of 7 bits for the sequence s (registers SA to SG)
5 words of 5 bits for the sequence t (registers TA to TE)

At the time n+1, the new state $x_{n+1}$ of the generator is:

$$x_{n+1} = \begin{pmatrix} RD+2 \cdot RG \text{ mod } 31^*; RA; RB; RC \oplus RI; RD; RE; RF \\ SF+2 \cdot SG \text{ mod } 127^*; SA; SB; SC; SD; SE \oplus SI; SF \\ TC+TE \text{ mod } 31^*; TA; TB \oplus TI; TC; TD \end{pmatrix}$$

The operation $\oplus$ represents the exclusive OR, addition bit by bit, modulo 2. The notations mod 31* and mod. 127* mean that following an addition, 31 or 127 is subtracted, provided that the result is higher than 31 or 127.

The initialization bytes only appear at inputs $B_8$ to $B_1$ during the initialization phase. These inputs are then kept at zero for as long as the generator supplies coding or decoding bytes.

The definition of the output byte takes place at from state $x_n$ by the group of circuits $R_{10}$, $T_{10}$, 30, 40, 50. More specifically, each of the five least significant bits of SA, as a function of its value at 0 or 1, controls the choice between the corresponding bit of $RA \oplus RE$ or the corresponding bit of $TA \oplus TD$.

If the bits of $RA \oplus RE$. SA and $TA \oplus TD$ are respectively written from the highest to lowest significance: $r_5 r_4 r_3 r_2 r_1$; $s_7 s_6 s_5 s_4 s_3 s_2 s_1$; $t_5 t_4 t_3 t_2 t_1$ then the coding byte is written bit by bit:

$$C_1 = r_1 \cdot s_1 + s_1 \cdot t_1 \text{ modulo } 2$$
$$\overline{C_5 = r_5 \cdot s_5 + s_5 \cdot t_5 \text{ modulo } 2}$$

$$C_6 = 0$$
$$C_7 = 0$$
$$C_8 = C_1 + \ldots + C_5 \text{ modulo } 2$$

It should be noted that for the decoding bytes, when the imparity bit has already been replaced by a good parity indication, the three most significant bits are at 0.

As indicated in the main patent application, the initialization of the coding or decoding byte generator can take place with the aid of the service key K (which is constituted by 64 bits, i.e. 8 bytes designated $k_1$ to $k_8$), the row number (which varies from 1 to 24 and which is coded on two bytes designated $NR_1$ and $NR_2$) and the page number (which varies from 001 to 999 and which is coded on three bytes designated $NP_1$, $NP_2$ and $NP_3$). This initialization of the generator is effected at the start of each information row, with the aid of eight special bytes, obtained from the eight bytes defining the service key and five bytes defining the page number and the row number.

The two bytes $NR_1$ and $NR_2$ coding a row number are respectively written x8 x7 x6 x5 x4 x3 x2 x1 and y8 y7 y6 y5 y4 y3 y2 y1 from the most significant to the least significant. The following bytes H(y4 y3 y2 y1), H(y8 y7 y6 y5), H(x4 x3 x2 x1) and H(x8 x7 x6 x5) are used for constituting the initialization bytes and are obtained by Hamming coding in the following known manner. On designating the different bits of such a byte H by g8 g7 ... g1, we obtain:

$$g7 = g8 \oplus g6 \oplus g4$$

$$g5 = g6 \oplus g4 \oplus g2$$

$$g3 = g4 \oplus g2 \oplus g8$$

$$g1 = g2 \oplus g8 \oplus g6$$

The correspondance is represented in the following Table I, in which the first column gives the value of the number in hexadecimal notation and the 8 following columns the values of the different bits. Columns g8, g6, g4, g2 correspond to the information bits and columns g7, g5, g3, g1 to the redundancy bits.

TABLE I

| Hexadecimal Notation | g8 | g7 | g6 | g5 | g4 | g3 | g2 | g1 |
|---|---|---|---|---|---|---|---|---|
| 0 | 0 | 0 | 0 | 1 | 0 | 1 | 0 | 1 |
| 1 | 0 | 0 | 0 | 0 | 0 | 0 | 1 | 0 |
| 2 | 0 | 1 | 0 | 0 | 1 | 0 | 0 | 1 |
| 3 | 0 | 1 | 0 | 1 | 1 | 1 | 1 | 0 |
| 4 | 0 | 1 | 1 | 0 | 0 | 1 | 0 | 0 |
| 5 | 0 | 1 | 1 | 1 | 0 | 0 | 1 | 1 |
| 6 | 0 | 0 | 1 | 0 | 1 | 0 | 0 | 0 |
| 7 | 0 | 0 | 1 | 0 | 1 | 1 | 1 | 1 |
| 8 | 1 | 1 | 0 | 1 | 0 | 0 | 0 | 0 |
| 9 | 1 | 1 | 0 | 0 | 0 | 1 | 1 | 1 |
| A | 1 | 0 | 0 | 0 | 1 | 1 | 0 | 0 |
| B | 1 | 0 | 0 | 1 | 1 | 0 | 1 | 1 |
| C | 1 | 0 | 1 | 0 | 0 | 0 | 0 | 1 |
| D | 1 | 0 | 1 | 1 | 0 | 1 | 1 | 0 |
| E | 1 | 1 | 1 | 1 | 1 | 1 | 0 | 1 |
| F | 1 | 1 | 1 | 0 | 1 | 0 | 1 | 0 |

Thus, FIG. 4 which, in normal binary code, is written 0100, is written in the Hamming code H(0100) = (01100100).

Under these conditions, the eight bytes IA ... IH used for initialization use these four Hamming bytes translating the row number, combined with 8 bytes $k_1$ to $k_8$ defining the key. A possible combination is defined by:

$$IA = k_1 \oplus H(y4 y3 y2 y1)$$

$$IB = k_2 \oplus H(y8 y7 y6 y5)$$

$$IC = k_3 \oplus H(x4 x3 x2 x1)$$

$$ID = k_4 \oplus H(x8 x7 x6 x5)$$

$$IE = k_5 \oplus NR_3$$

$IF = k_6 \oplus NR_2$ $IG = k_7 \oplus NR_1$ $IH = K_8$

An example will provide a better understanding of the initialization byte processing process.

The service key K is defined by the eight following bytes (hexadecimal notation, i.e. in accordance with the code of column 1 of Table I referred to hereinbefore): $k_1 = 17$; $k_2 = BE$; $k_3 = 62$; $k_4 = A9$; $k_5 = 65$; $k_6 = 3C$; $k_7 = 84$; $k_8 = D0$.

It is assumed that the row to be coded is defined by $US = 1F$, $NR_1 = 45$, $NR_2 = C_1$ and that this row belongs to a page defined by: $SOH = 01$, $RS = 9E$, $NP_1 = 15$; $NP_2 = 64$; $NP_3 = 73$.

In accordance with the notation of the bytes referred to hereinbefore, code 1/5 signifies 0001/0101, i.e. 0, when taking account of the Hamming code used in the above table 6/4 corresponds to 4 and 7/3 to 5. The page in question defined by $NP_1 = 15$, $NP_2 = 64$ and $NP_3 = 73$ is consequently page 045.

The four bytes defining row $NR_1$, $NR_2$ to be taken into account are then respectively $H(NR_{2f})$, $H(NR_{2F})$, $H(NR_{1f})$, $H(NR_{1F})$ if $NR_{2f}$ and $NR_{2F}$ respectively designate the four least and most significant bits of $NR_2$ and $NR_{1f}$, $NR_{1F}$ the four least and most significant bits of $NR_1$. In the envisaged case the four bytes H(1), H(C), H(5), H(4) are respectively, on the basis of the table of Hamming codes: (02), (A1), (73) and (64).

The eight initialization bytes of the generator are then:

| | | | |
|---|---|---|---|
| $I_1 = k_1 \oplus H(NR_{2f})$ | $= k_1 \oplus H(1)$ | $= $ '17' $\oplus$ '02' | $= $ '15' |
| $I_2 = k_2 \oplus H(NR_{2F})$ | $= k_2 \oplus H(C)$ | $= $ 'BE' $\oplus$ 'A1' | $= $ '1F' |
| $I_3 = k_3 \oplus H(NR_{1f})$ | $= k_3 \oplus H(5)$ | $= $ '62' $\oplus$ '73' | $= $ '11' |
| $I_4 = k_4 \oplus H(NR_{1F})$ | $= k_4 \oplus H(4)$ | $= $ 'A9' $\oplus$ '64' | $= $ 'CD' |
| $I_5 = k_5 \oplus C3$ | $= k_5 \oplus H(5)$ | $= $ '65' $\oplus$ '73' | $-$ '16' |
| $I_6 = k_6 \oplus C2$ | $= k_6 \oplus H(4)$ | $= $ '3C' $\oplus$ '64' | $= $ '58' |
| $I_7 = k_7 \oplus C1$ | $= k_7 \oplus H(0)$ | $= $ '84' $\oplus$ '15' | $= $ '91' |
| $I_8 = k_8$ | $= k_8$ | $= $ 'D0' | $= $ 'D0' |

These eight initialization bytes make it possible to constitute eight triplets RI, SI, TI by the choice of certain of the bits forming them, said choice being dictated by the special connections of the inputs of the three subassemblies R, S and T to the accesses. These triplets are used for the initialization of the three subassemblies R, S and T. The following table gives the values of the words RI, SI and TI in binary and decimal code. It is pointed out that if byte I is written b8b7b6b5b4b3b2b1, then RI is written b5b4b3b2b1, SI is written b4b3b2b1b8b7b6 and TI is written b8b7b6b5b4.

TABLE II

| I | | RI | | SI | | TI | |
|---|---|---|---|---|---|---|---|
| $I_1$ | '15' = 0001 0101 | 10101 | = 21 | 0101 000 | = 40 | 00010 | = 2 |
| $I_2$ | '1F' = 0001 1111 | 11111 | = 31 | 1111 000 | = 120 | 00011 | = 3 |
| $I_3$ | '11' = 0001 0001 | 10001 | = 17 | 0001 000 | = 8 | 00010 | = 2 |
| $I_4$ | 'CD' = 1100 1101 | 01101 | = 13 | 1101 110 | = 110 | 11001 | = 25 |
| $I_5$ | '16' = 0001 0110 | 10110 | = 22 | 0110 000 | = 48 | 00010 | = 2 |
| $I_6$ | '58' = 0101 1000 | 11000 | = 24 | 1000 010 | = 66 | 01011 | = 11 |
| $I_7$ | '91' = 1001 0001 | 10001 | = 17 | 0001 100 | = 12 | 10010 | = 18 |
| $I_8$ | 'D0' = 1101 0000 | 10000 | = 16 | 0000 110 | = 6 | 11010 | = 26 |

At the start of the row in question, the generator successively takes into account the initialization bytes. This means that each subassembly successively takes into account the eight initialization words RI, SI or TI relating to it. The first registers receiving these initialization words are registers RD, SF and TC. These words are then displaced towards the registers RE, SG and TC, whereas the first registers RD, SF and TC receive the second initialisation words. Table III gives the development of the contents of the different registers, step by step, as a function of the development of the initialization words appearing at the input of the exclusive OR gates opening each subassembly.

TABLE III

| | | | | | | | | |
|---|---|---|---|---|---|---|---|---|
| RI | 21 | 31 | 17 | 13 | 22 | 24 | 17 | 16 — |
| RG | 0 | 0 | 0 | 0 | 21 | 31 | 17 | 13 3 |
| RF | 0 | 0 | 0 | 21 | 31 | 17 | 13 | 3 7 |
| RE | 0 | 0 | 21 | 31 | 17 | 13 | 3 | 7 0 |
| RD | 0 | 21 | 31 | 17 | 13 | 3 | 7 | 0 8 |
| RC | 0 | 0 | 0 | 0 | 21 | 31 | 17 | 24 3 |
| RB | 0 | 0 | 0 | 21 | 31 | 17 | 24 | 3 10 |
| RA | 0 | 0 | 21 | 31 | 17 | 24 | 3 | 10 26 |
| SI | 40 | 120 | 8 | 110 | 48 | 66 | 12 | 6 — |
| SG | 0 | 0 | 40 | 120 | 8 | 110 | 48 | 66 36 |
| SF | 0 | 40 | 120 | 8 | 110 | 48 | 66 | 36 79 |
| SE | 0 | 0 | 0 | 0 | 0 | 0 | 40 | 73 121 |
| SD | 0 | 0 | 0 | 0 | 0 | 40 | 73 | 121 126 |
| SC | 0 | 0 | 0 | 0 | 40 | 73 | 121 | 126 14 |
| SB | 0 | 0 | 0 | 40 | 73 | 121 | 126 | 14 35 |
| SA | 0 | 0 | 40 | 73 | 121 | 126 | 14 | 35 41 |
| TI | 2 | 3 | 2 | 25 | 2 | 11 | 18 | 26 — |
| TE | 0 | 0 | 0 | 2 | 3 | 2 | 27 | 1 15 |
| TD | 0 | 0 | 2 | 3 | 2 | 27 | 1 | 15 12 |
| TC | 0 | 2 | 3 | 2 | 27 | 1 | 15 | 12 25 |
| TB | 0 | 0 | 0 | 2 | 3 | 4 | 30 | 3 11 |
| TA | 0 | 0 | 2 | 3 | 4 | 30 | 3 | 11 13 |

Following the taking into account of the eighth initialization byte, the generator is ready to supply the first coding byte. The content of the registers is:

| | | | |
|---|---|---|---|
| RA = 26 | RE = 0 | RA $\oplus$ RE = 26 = | 1 1 0 1 0 |
| SA = 41 | giving | SA = 41 = 01 | 0 1 0 0 1 |
| TA = 13 | TD = 12 | TA$\oplus$TD = 01 = | 0 0 0 0 1 |

The 5 bits obtained at the output of gate 50 are 1 0 0 1 1 and the first coding byte is therefore '93' in the hexadecimal system.

The following states are obtained by the aforementioned recursivities:

$$r_{i+1} = r_{i-3} + 2 \cdot r_{i-6} \mod 31^*$$

$$s_{i+1} = s_{i-5} + 2 \cdot s_{i-5} \mod 127^*$$

$$t_{i+1} = t_{i-2} + t_{i-4} \mod 31^*$$

The five basic bits of the coding byte are obtained by: $(r_{i+1} \oplus r_{i-2}) \cdot \bar{s}_i + s_i \cdot (t_{i+1} \oplus t_{i-1})$
operation $\oplus$ being exclusive OR, addition bit by bit, modulo 2, the operation "·" being logic AND, multiplication bit by bit, modulo 2.

The thirteen first coding bytes are: '93', '96', '9A', '82', '1D', '12', '17', '1D', '8B', '87', '1D', '18', '95', ....

In general terms by designating by $d_1, d_2, d_3$ ... the clear bytes of one row, by $C_1, C_2, C_3$ the coding bytes supplied by the generator and by $D_1, D_2, D_3$ ... the coded bytes, the following sequence of codes is obtained:

| | | |
|---|---|---|
| Clear bytes: | US $NR_1$ $NR_2$ | $d_1$ $d_2$ $d_3$ $d_4$ $d_5$ $d_6$ $d_7$ ... |
| Coding bytes: | | $C_1$ $C_2$ $C_3$ $C_4$ $C_5$ $C_6$ $C_7$ ... |
| Coded bytes: | US $NR_1$ $NR_2$ | $D_1$ $D_2$ $D_3$ $D_4$ $D_5$ $D_6$ $D_7$ ... |
| | | $d_i$, if $d_i$ belongs to columns 0 or 1, |

-continued 10 with $D_i = \begin{cases} \\ d_i \oplus C_b \text{ if } d_i \text{ belongs to columns 2 to 7.} \end{cases}$ Thus, with the preceding example of a row starting 'IF', '45', 'C1', and continuing by: '20', '20', '20', '9B', '4F', '57', '45', 'C1', '54', 'C8', '45', '52', '20', the coded row corresponding to this is: . . . '1F', '45', 'c1', 'B3', 'B6', 'BA', '9B', '52', '45', '52', 'DC', 'DF', '4F', '58', '4A', 'B5'.

Figure 3:
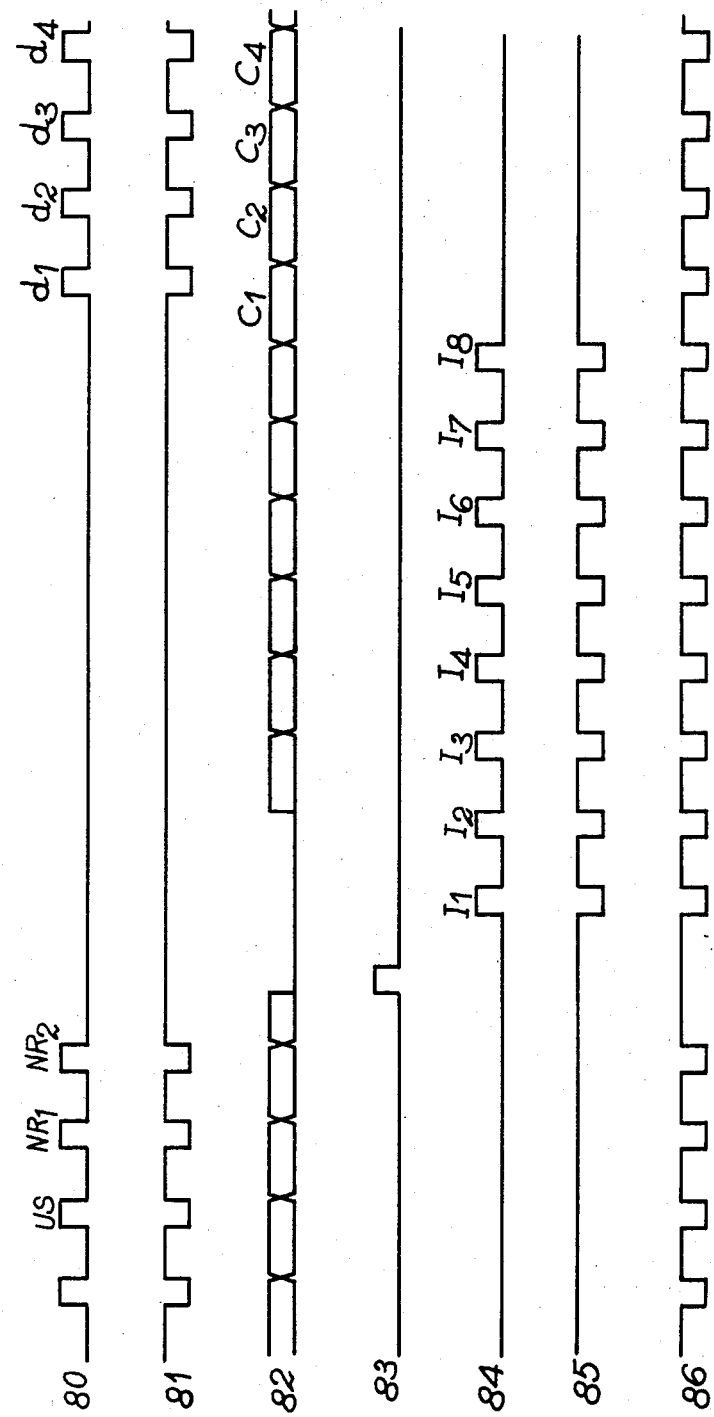
FIG. 3 a time diagram showing a few signals involved in the circuit of FIG. 2.

FIG. 3 is a time diagram showing the development of the different signals involved in the crcuit of FIG. 1. Line 80 represents the clear signals (US followed by $NR_1$ and $NR_2$, followed by the actual data $d_1$, $d_2$, etc), line 81 represents the complement of the reading signal of the register supplied by input 81 of circuit 72, line 82 represents the coding sequence $C_1$, $C_2$, $C_3$, . . . , line 83 the generator resetting pulse supplied by circuit 72, line 84 represents the initialization times $I_1$ to $I_8$, line 85 the complement of the signal for entering the initialization bits in to the registers and line 86 the clock pulses supplied by 70.

What is claimed is:

1. An encoding or decoding byte generator, wherein it comprises:

(a) 8 input accesses, respectively $B_8$, $B_7$, . . . $B_1$ with the highest significance level at the heading;

(b) a first subassembly R, constituted by 5 exclusive OR logic gates ($RP_5$ to $RP_1$) with two inputs and an output, 7 registers (RA, RB, RC, RD, RE, RF, RG) and an adder (RAd) modulo 31, all these registers and adder having five bits and having parallel inputs-outputs, the adder having two input groups ($RAd_1$, $RAd_2$), the connections between these registers and the adder being as follows:

the exclusive OR gates have an input connected to the five least significant accesses $B_1$ to $B_5$, the first register RD has its inputs connected to the outputs of the gates and its outputs connected on the one hand to the inputs of register RE and on the other to the inputs of a group ($RAd_2$) of the adder, the outputs of register RE are connected to the inputs of register RF, whose outputs are connected to the inputs of register RG, the outputs of this register, after circular shift by one rank, towards the higher significance levels, are connected to the inputs of the other group of the adder ($RAd_1$), the latter having its outputs connected to the inputs of register RA, whose outputs are connected to the inputs of register RB, the outputs of the latter being connected to the inputs of register RC, and the outputs of said register being relooped on to the other inputs of the exclusive OR gates, said first subassembly R also having a 5-bit, exclusive OR logic circuit ($R_{10}$) having a first group of inputs (12) connected to the outputs of register RE and a second group of inputs (14) connected to the outputs of register RA, said circuit having a 5-bit output constituting output (16) of the first subassembly;

(c) a second subassembly S constituted by 7 exclusive OR gates ($SP_7$, . . . $SP_1$) with two inputs and an output, 7 registers (SA, SB, SC, SD, SE, SF, SG) and an adder (SAd) modulo 127, all these registers and the adder having 7 bits and parallel inputs-outputs, the adder having two groups of inputs ($SAd_1$, $SAd_2$) the connections between these registers and the adder being as follows:

the exclusive OR gates $S_7$ to $S_4$ have an input connected to accesses $B_4$, $B_3$, $B_2$, $B_1$ and gates $S_3$ to $S_1$ to accesses $B_8$, $B_7$, $B_6$, the first register SF has its inputs connected to the outputs of the preceding gates, the outputs of register SF are connected on the one hand to the inputs of register SG and on the other to the inputs ($SAd_2$) of one of the groups of the adder, register SG having its outputs connected, after circular shift by one rank towards the highest significance levels, to the inputs of the other group ($SAd_1$) of the adder, the outputs of the adder being connected to the inputs of register SB, then connected to registers SC, SD and SF in series, the outputs of register SE being relooped on to the other inputs of gates $SP_7$ to $SP_1$ said second subassembly S having a 5-bit output (20) forming the 5 least significant bits of register SA;

(d) a third subassembly T constituted by 5 exclusive OR gates ($TP_5$, . . . $TP_1$) having two inputs and an output, 5 registers (TA, TB, TC, TD, TE) and an adder modulo 31 (TAd), all these registers and the adder having 5 bits and parallel inputs-outputs, the adder having two groups of inputs ($TAd_1$, $TAd_2$), the connections between these registers and the adder being as follows:

the exclusive OR gates have an input connected to accesses $B_8$, $B_7$, $B_6$, $B_5$, $B_4$, the inputs of the first register RC being connected to the outputs of the preceding gates and the outputs are connected on the one hand to the inputs of register TD and on the other hand to the inputs ($TAd_2$) of one of the groups of the adder, the outputs of the register TD being connected to the inputs of register TE, the outputs of the register being connected to the input ($TAd_1$) of the other group of the adder, the outputs of the latter being connected to the inputs of register TA, the outputs of this register being connected to the inputs of register TB, whose outputs are relooped on to the other inputs of gates $T_5$, . . . $T_1$, said third subassembly T also having a 5-bit, exclusive OR logic circuit ($T_{10}$), incorporating a first group of inputs (22) connected to the outputs of register TD and a second group of inputs (24) connected to the outputs of register TA, said logic circuit having a 5-bit output constituting the output (26) of the third subassembly T;

(e) a first 5-bit, AND-type logic circuit (30) having two inputs (31, 32) and an output (33), whereby one of the inputs (31) is connected to output (16) of the first subassembly R and the other reversed input (32) is connected to output (20) of the second subassembly S;

(f) a second 5-bit, AND-type logic circuit (40) having two inputs (41, 42) and an output (43) one of the inputs (41) being connected to ouput (26) of the third subassembly T and the other to output (20) of the second subassembly S;

(g) a 5-bit, logic OR circuit (50), having two inputs (51, 52) and an output (53), one of the inputs (51) being connected to the output (33) of the first exclusive OR circuit ($R_{10}$) and the other (52) to the output of the second exclusive OR circuit ($T_{10}$);

(h) a modulo 2 adder (60) having a 5-bit input (61) connected to the output (53) of the logic OR circuit (50) and a one-bit output (62);

(i) 8 output accesses, respectively $c_8$, $c_7$ . . . $c_1$ with the highest significance at the heading, access $c_8$ being connected to output (62) of adder (60), accesses $c_6$ and $c_7$ being permanently maintained at logic state 0 and accesses $c_5$, $c_4$, . . . $c_1$ being connected to the 5-bit output (53) of logic OR circuit (50).

* * * * *